(12) United States Patent
Kamioka et al.

(10) Patent No.: US 6,744,721 B2
(45) Date of Patent: Jun. 1, 2004

(54) OPTICAL DISK DRIVE

(75) Inventors: Yuichi Kamioka, Katano (JP); Chikashi Inokuchi, Hirakata (JP); Takayuki Sakabayashi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 243 days.

(21) Appl. No.: 10/142,511

(22) Filed: May 9, 2002

(65) Prior Publication Data

US 2002/0167888 A1 Nov. 14, 2002

(30) Foreign Application Priority Data

May 11, 2001 (JP) ........................................ 2001-141215

(51) Int. Cl.[7] ................................................. G11B 7/00
(52) U.S. Cl. .............................. 369/124.12; 369/44.41; 369/47.1; 369/53.21
(58) Field of Search .......................... 369/44.27, 44.34, 369/44.41, 44.42, 47.1, 53.1, 53.21, 53.23, 59.1, 59.23, 124.01, 124.11, 124.12

(56) References Cited

U.S. PATENT DOCUMENTS 6,058,093 A * 5/2000 Kato et al. ................ 369/44.41
6,097,678 A 8/2000 Yoshida et al.
6,208,614 B1 * 3/2001 Kim ......................... 369/275.4
6,337,838 B1 1/2002 Hikima et al.

FOREIGN PATENT DOCUMENTS

JP 2000-195058 A 7/2000
JP 2002-56532 A 2/2002

* cited by examiner

*Primary Examiner*—Muhammad Edun
(74) *Attorney, Agent, or Firm*—Akin, Gump, Strauss, Hauer & Feld, L.L.P.

(57) ABSTRACT

An optical disk drive reads and/or writes data from/on an optical disk on which a pre-pit has been formed on at least one side edge of a data recording track. The disk drive includes light-emitting element, photodetector section, subtractor and amplifier. The light-emitting element emits a light beam and irradiates the track with the light beam. The photodetector section receives and detects the light beam reflected from the track, thereby generating first and second detection signals, carrying information about shapes of the track at the one and the other side edges thereof, respectively, based on the reflected light beam. The subtractor generates a differential signal representing a difference between the first and second detection signals. The amplifier amplifies the differential signal, output from the subtractor, by a variable amplification factor. The optical disk drive detects the pre-pit in accordance with the amplified differential signal.

19 Claims, 13 Drawing Sheets

NORMAL AMPLITUDE

SMALL AMPLITUDE

LARGE AMPLITUDE

DATA ALREADY WRITTEN

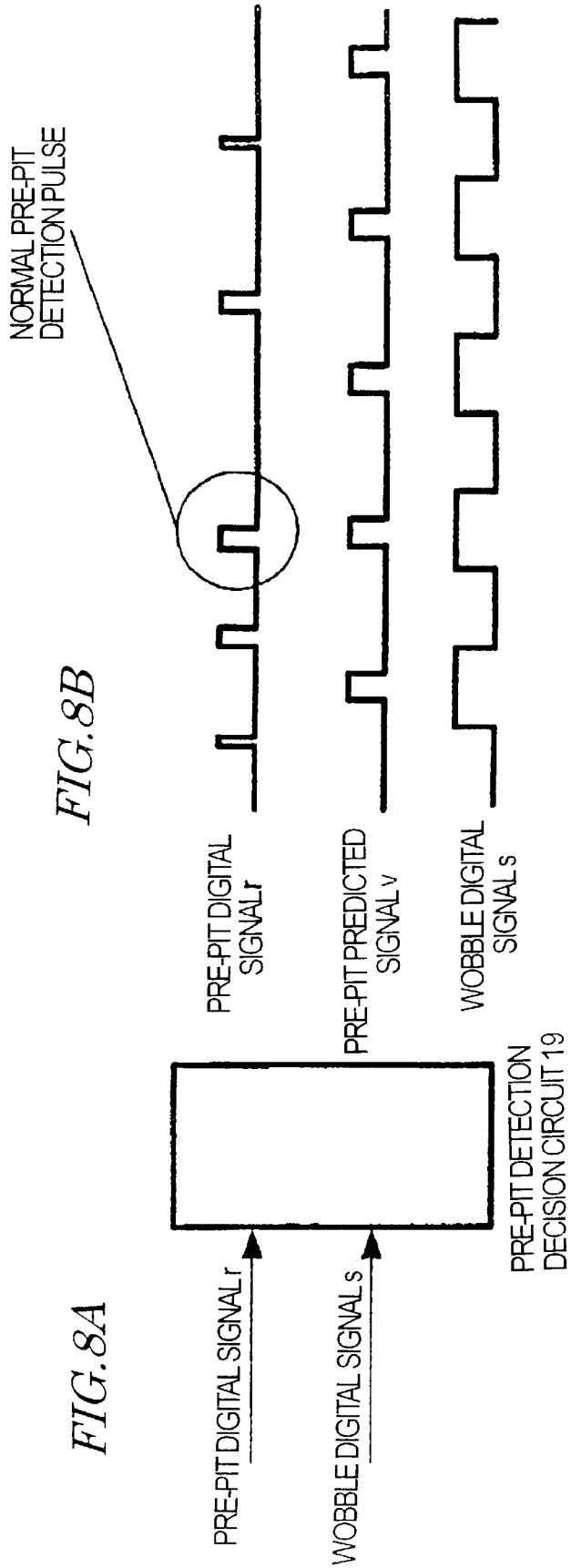

FIG.9A
Define Gain While Reading Information From Unrecorded Area
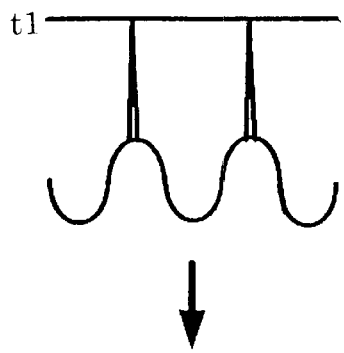
When Information Is Read From Recorded Area
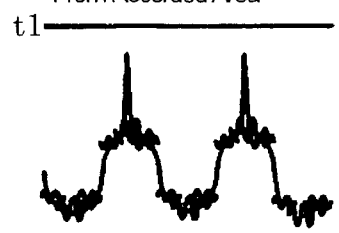
FIG.9B
Define Gain While Reading Information From Recorded Area
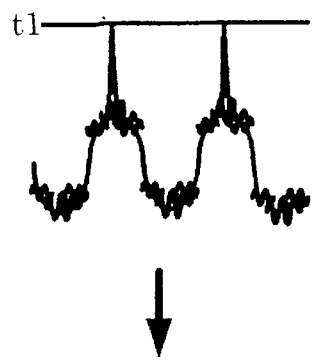
When Information Is Read From Unrecorded Area
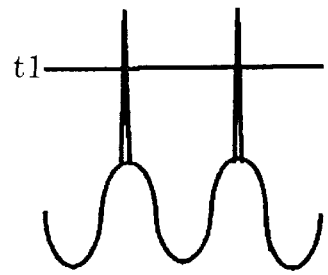
FIG.10
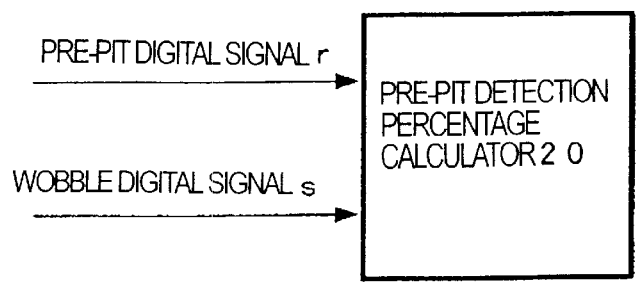

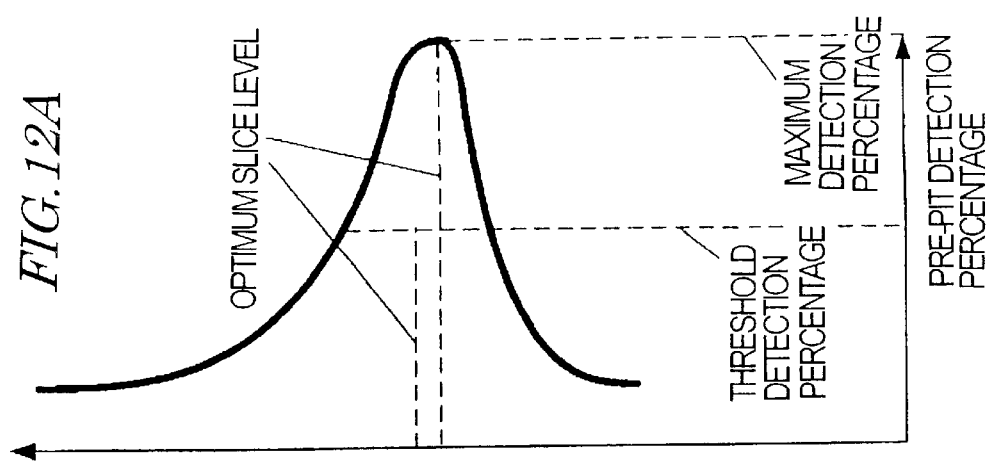
FIG. 12A
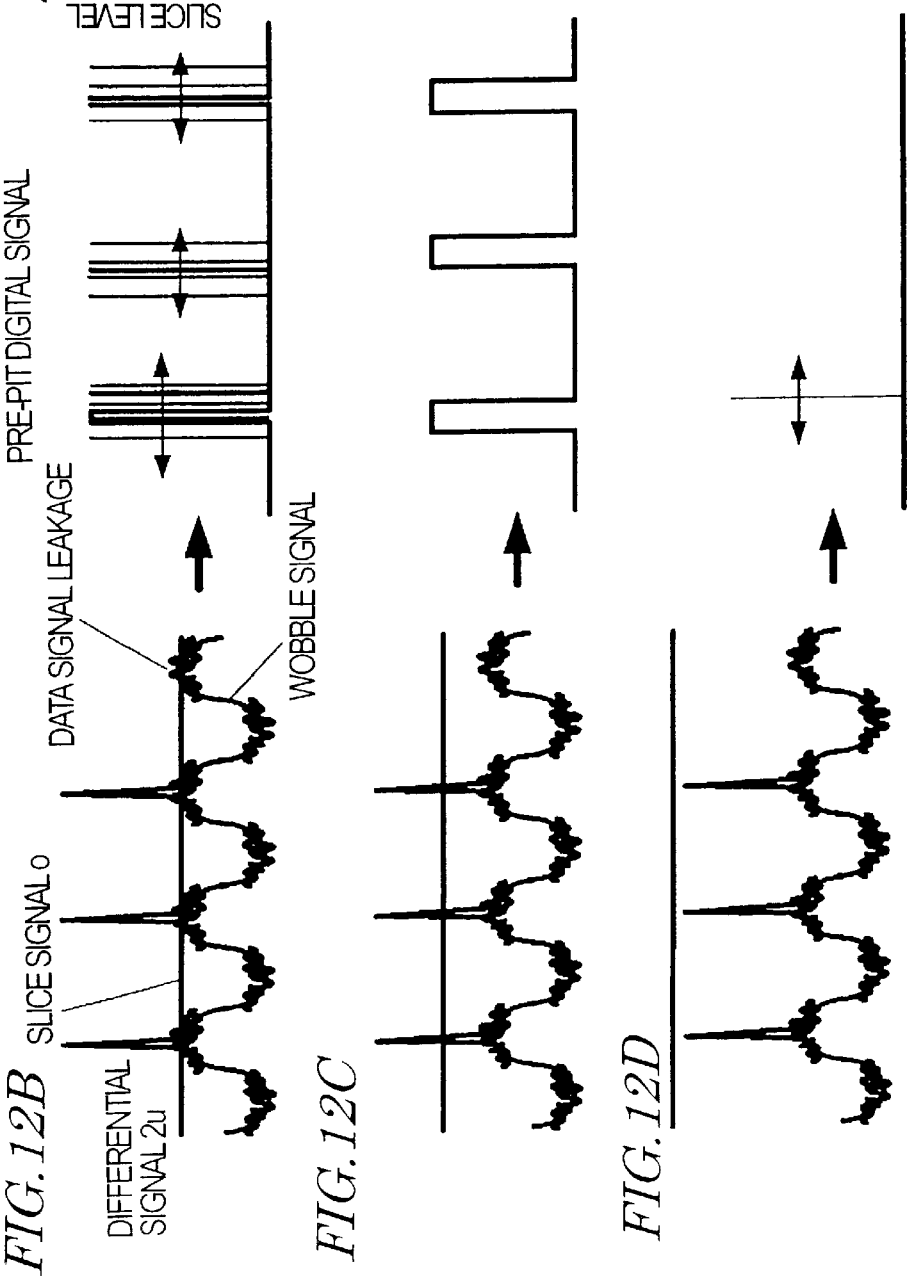
FIG. 12B
FIG. 12C
FIG. 12D

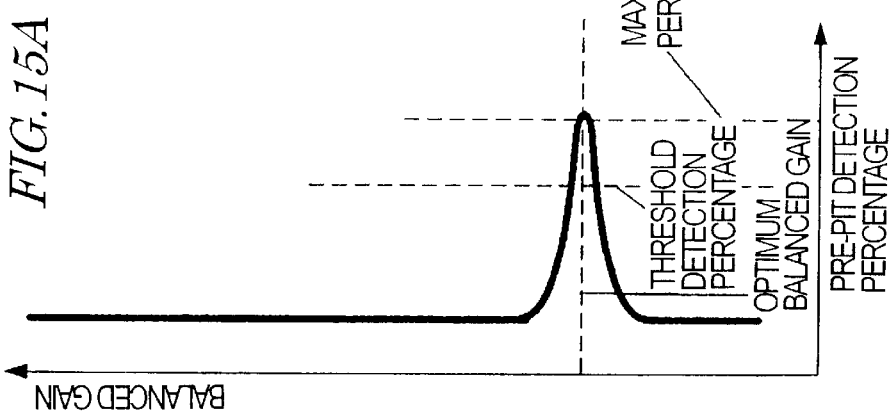
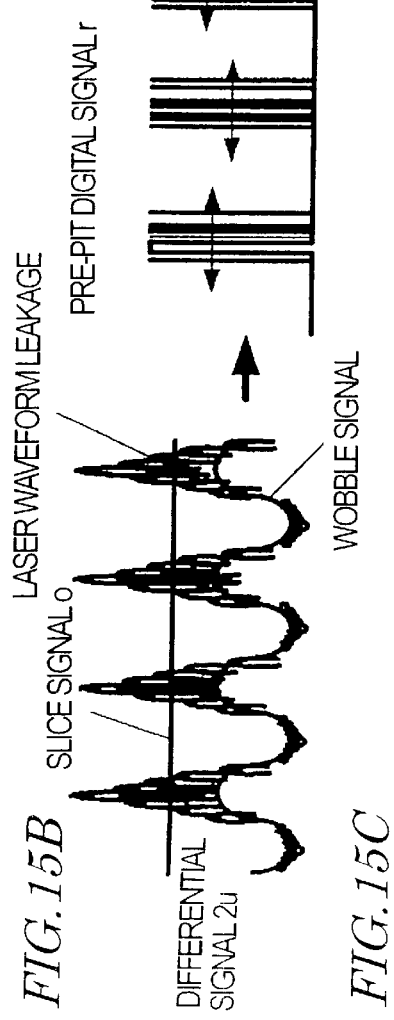
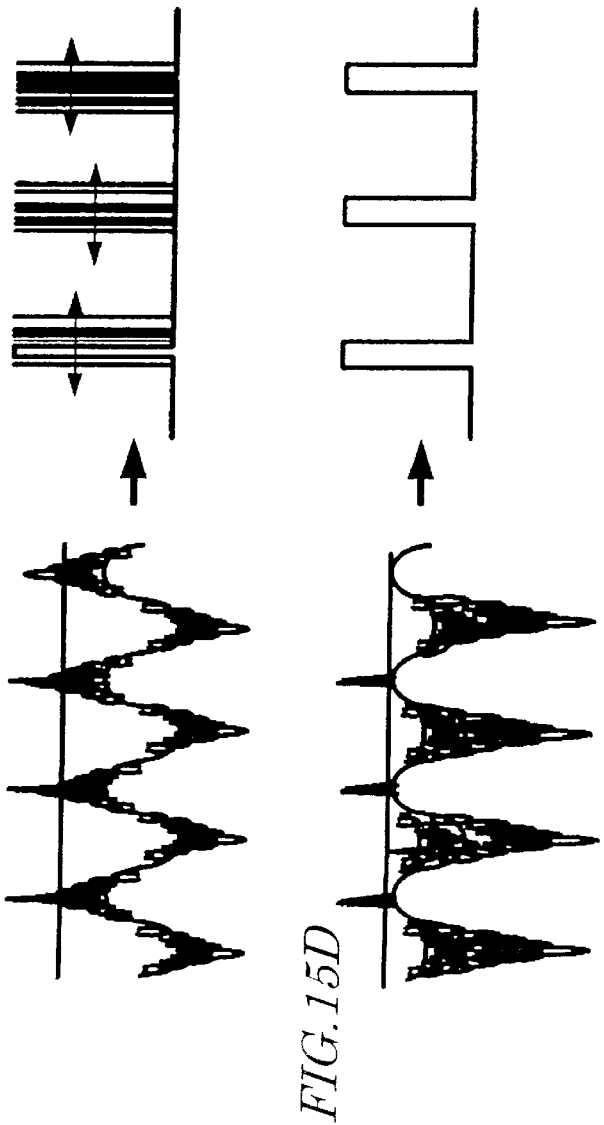

OPTICAL DISK DRIVE

BACKGROUND OF THE INVENTION

1. Field of the Invention

The present invention relates to an optical disk drive for reading and/or writing data from/on an optical disk on which pre-pits, representing address information and other types of information, have been formed.

2. Description of the Related Art

Recently, recordable optical disks of various types, including CD-R and CD-RW, have been popularized as storage media for storing computer data or recording music thereon. In the meantime, new types of optical disks with a storage capacity high enough to store video data thereon, e.g., DVD-RAM, DVD-R and DVD-RW, have also been put on the market just lately. Among these new optical disks, the DVD-R and the DVD-RW have disk formats similar to that of a DVD-ROM as a read-only medium so as to be read by a read-only DVD drive relatively easily.

More specifically, as shown in FIG. 1, an optical disk 4 such as a DVD-R has grooves for guiding a light spot during a data read/write operation. Data is written on and along these grooves. These grooves are wobbled at a constant frequency to generate a reference clock signal for use to control the number of revolutions of the disk 4. Also, pre-pits have been formed on land(s) that is/are adjacent to each of those grooves. The "land" is a disk area between a pair of grooves. These pre-pits (i.e., so-called "land pre-pits") are used to correct the phase of a write clock signal during a data write operation, for example. By using these pre-pits that have been formed in advance on the optical disk, the write operation can be performed even more accurately.

Just like the wobble pattern of a groove, each pre-pit that has been formed on a land adjacent to a groove is detected as a differential signal representing a difference between the intensity of light that has been reflected from an outer land and that of light that has been reflected from an inner land. As used herein, the "outer land" refers to a land that is adjacent to a groove in the radial direction of the disk and closer to the outer periphery of the disk, while the "inner land" refers to a land that is adjacent to the same groove in the radial direction of the disk and closer to the inner periphery of the disk. FIG. 2 illustrates a differential signal that has been detected in this manner and converted into an electric signal. As shown in FIG. 2, the differential signal includes a wobble signal component representing wobbling information and a pre-pit signal component corresponding to the pre-pits. A method for detecting the pre-pit signal component is described in Japanese Laid-Open Publication No. 2000-195058, for example.

However, the pre-pits to be formed on the disk are sometimes deformed and cannot take their desired shapes depending on the cutting conditions of the disk manufacturing process, for example. Also, a signal representing a pre-pit detected may have its amplitude varied because a read beam spot detected by an optical pickup is likely to have a deformed shape in the disk radial direction, in particular, and because the disk itself is sometimes warped or tilted. Furthermore, if data was already written on a recording track, a signal component representing the written data, which should have been eliminated from a differential signal, might be detected from the differential signal. For these reasons, the pre-pit signal may sometimes be detected inaccurately depending on a particular combination of the disk and the disk drive used.

Accordingly, in an optical disk drive, the circuit section thereof for detecting the pre-pit signal needs to be appropriately adjusted to the individual disk drive/disk combination. Recently, in particular, as the density of the data written on a disk goes on increasing, it becomes more and more difficult to detect the pre-pit signal accurately enough. Thus, an optical disk drive to deal with an optical disk having an even higher storage capacity must detect the pre-pit signal, and generate a sync signal, even more accurately.

SUMMARY OF THE INVENTION

In order to overcome the problems described above, an object of the present invention is to provide an optical disk drive that can detect the pre-pit signal even more accurately.

An optical disk drive according to the present invention is used to read and/or write data from/on an optical disk on which a pre-pit has been formed on at least one side edge of a data recording track. The disk drive includes light-emitting element, photodetector section, subtractor and amplifier. The light-emitting element emits a light beam and irradiates the track of the optical disk with the light beam. The photodetector section receives and detects the light beam that has been reflected from the track, thereby generating first and second detection signals based on the reflected light beam. The first and second detection signals carry information about a shape of the track at the one side edge thereof and information about a shape of the track at the other side edge thereof, respectively. The subtractor generates a differential signal representing a difference between the first and second detection signals. The amplifier amplifies the differential signal, which has been output from the subtractor, by a variable amplification factor and outputs an amplified differential signal. The optical disk drive detects the pre-pit in accordance with the amplified differential signal.

In one preferred embodiment of the present invention, the optical disk drive further includes a pre-pit detection decision circuit for determining whether or not a signal component of the amplified differential signal representing the pre-pit corresponds to the pre-pit that has been actually formed on the optical disk. The amplification factor is defined for the amplifier in accordance with the output of the pre-pit detection decision circuit.

In this particular preferred embodiment, the optical disk drive preferably further includes a digitizer for digitizing the amplified differential signal and outputting a digital signal representing the pre-pit. The pre-pit detection decision circuit determines whether or not the digital signal corresponds to the pre-pit that has been actually formed on the optical disk.

More particularly, the amplification factor of the amplifier is preferably defined while being changed with a slice level of the digitizer fixed.

In still another preferred embodiment, the amplification factor of the amplifier is defined in accordance with the differential signal representing the difference between the first and second detection signals that have been generated based on the light beam reflected from a part of the track on which no data has been written yet.

In yet another preferred embodiment, the light-emitting element records information representing the defined amplification factor on the optical disk.

In yet another preferred embodiment, the optical disk drive further includes a storage device for storing information representing the defined amplification factor thereon.

In yet another preferred embodiment, the optical disk drive further includes a balance controller for adjusting a balance between the first and second detection signals. The subtractor generates the differential signal representing the difference between the first and second detection signals that have had their balance adjusted.

In this particular preferred embodiment, the optical disk drive further includes a pre-pit detection decision circuit for determining whether or not a signal component of the amplified differential signal, representing the pre-pit, corresponds to the pre-pit that has been actually formed on the optical disk.

More particularly, the optical disk drive preferably further includes a pre-pit detection percentage calculator for calculating a pre-pit detection percentage based on a result obtained by the pre-pit detection decision circuit. The balance controller preferably defines the balance by the pre-pit detection percentage.

In that case, the optical disk drive preferably further includes a digitizer for digitizing the amplified differential signal and outputting a digital signal representing the pre-pit. The pre-pit detection decision circuit preferably determines whether or not the digital signal corresponds to the pre-pit that has been actually formed on the optical disk.

In such a preferred embodiment, the optical disk drive further includes a slice level changer for changing a slice level at the digitizer. The slice level changer preferably defines the slice level in accordance with the pre-pit detection percentage.

More specifically, when predetermined initial values of the balance and the slice level are represented by B0 and S0, respectively, the balance to be defined is preferably estimated by comparing an initial pre-pit detection percentage D (B0) corresponding to the initial balance value B0 with another pre-pit detection percentage D (B1) corresponding to another balance value B1, which is greater or smaller than the initial balance value B0 by a predetermined difference ΔB, and the slice level to be defined is preferably estimated by comparing another initial pre-pit detection percentage D (S0) corresponding to the initial slice level S0 with another pre-pit detection percentage D (S1) corresponding to another slice level S1, which is greater or smaller than the initial slice level S0 by a predetermined difference ΔS.

Alternatively, the balance and the slice level may be defined in accordance with the differential signal representing the difference between the first and second detection signals that have been generated based on the light beam reflected from a part of the track on which data has already been written.

As another alternative, the balance and the slice level may also be defined while data is being written on the track of the optical disk.

In yet another preferred embodiment, the light-emitting element records information representing the defined balance and information representing the defined slice level on the optical disk.

In yet another preferred embodiment, the optical disk drive further includes a storage device for storing the defined balance and the defined slice level thereon.

In yet another preferred embodiment, the track of the optical disk has a wobble pattern. The optical disk drive further includes a wobble digitizer for generating a digital signal representing the wobble pattern. And responsive to a pre-pit predicted signal that has been generated in accordance with the output of the wobble digitizer, the pre-pit detection decision circuit determines whether or not the signal component of the differential signal representing the pre-pit corresponds to the pre-pit that has been actually formed on the optical disk.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4A shows a light spot that has been formed on an optical disk; and

FIGS. 4B and 4C show arrangements of photodiodes.

FIGS. 6A, 6B and 6C show three differential signals with mutually different amplitudes; and FIG. 6D shows a differential signal into which a data signal has leaked.

FIG. 7A is a flowchart showing respective processing steps to be carried out to define the gain; and FIG. 7B shows how the waveforms of the differential signal and pre-pit digital signal change through the processing steps shown in FIG. 7A.

FIG. 8A is a block diagram showing a pre-pit detection decision circuit for the optical disk drive shown in FIG. 3; and FIG. 8B shows the waveforms of respective signals used by the pre-pit detection decision circuit shown in FIG. 8A.

FIGS. 9A and 9B show how the optical disk drive shown in FIG. 3 defines the gain when information is read out from a data unrecorded area and a data recorded area, respectively.

FIG. 10 is a block diagram showing a pre-pit detection percentage calculator for the optical disk drive shown in FIG. 3.

FIG. 12A is a graph showing a relationship between the slice level and the pre-pit detection percentage in the optical disk drive shown in FIG. 3; and FIGS. 12B, 12C and 12D show how the waveforms of the differential signal and pre-pit digital signal change with the slice level adopted.

FIG. 15A is a graph showing how the relationship between the balanced gain and the pre-pit detection percentage changes in the optical disk drive shown in FIG. 3 during a write operation thereof; and FIGS. 15B, 15C and 15D show how the waveforms of the differential signal and pre-pit digital signal change with the balanced gain adopted.

DETAILED DESCRIPTION OF PREFERRED EMBODIMENTS

Hereinafter, preferred embodiments of the present invention will be described with reference to the accompanying drawings.

Figure 1:
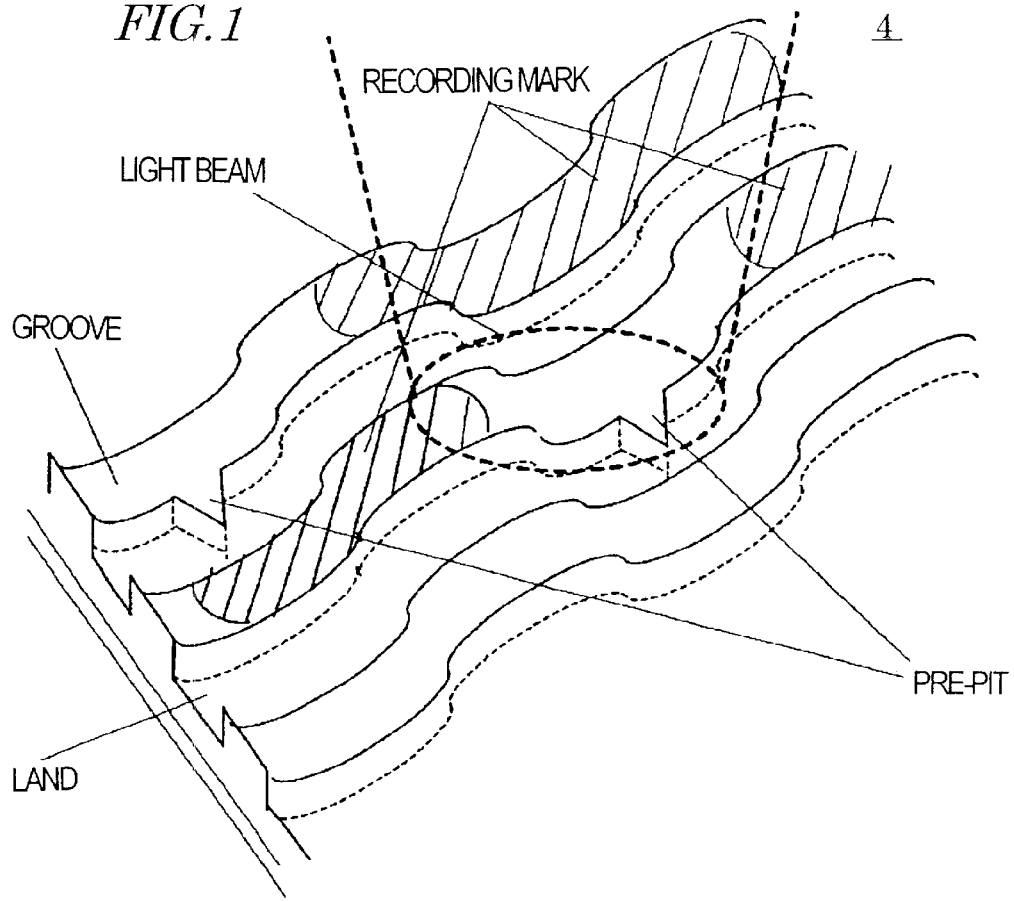
FIG. 1 is a perspective view illustrating a portion of an optical disk to a larger scale.

An optical disk drive according to a preferred embodiment of the present invention can be used to read and/or write data from/on an optical disk (e.g., DVD-R) such as that shown in FIG. 1 on which pre-pits have been formed on at least one side edge of an information track where data is to be written. It should be noted that the "information track" (which will be herein simply referred to as a "track") herein means a linear recording zone defined on the recordable area of the optical disk and typically refers to either a groove or a land. In this preferred embodiment, the "information track" is a groove and the "at least one side edge" of the track includes a land adjacent to the groove. Also, concentric or spiral grooves have been formed on the optical disk for use in this preferred embodiment. As shown in FIG. 1, these grooves are wobbled at a predetermined frequency.

Figure 3:
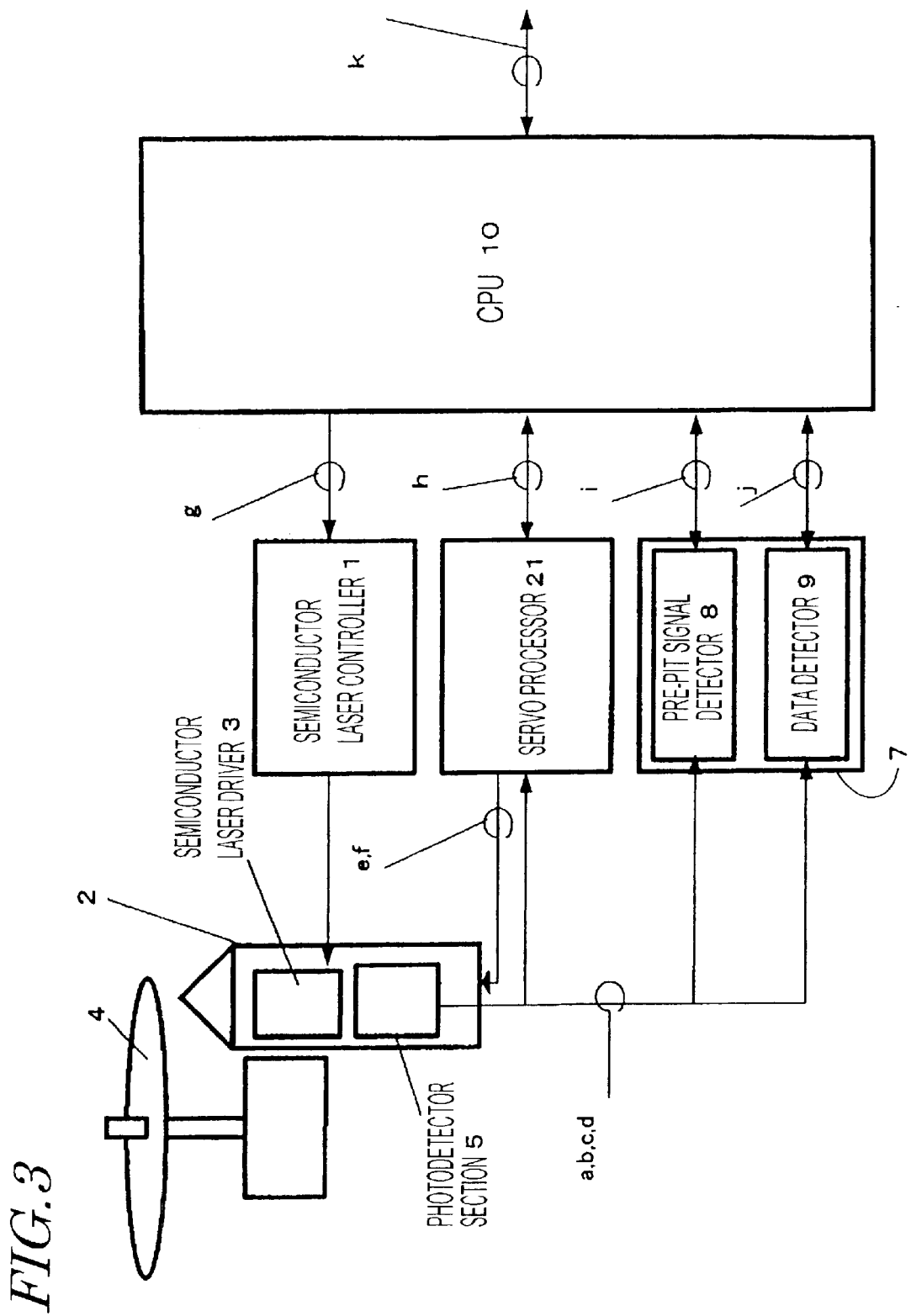
FIG. 3 is a block diagram showing an overall system configuration for an optical disk drive according to a preferred embodiment of the present invention.

FIG. 3 illustrates an overall configuration for an optical disk drive 100 according to this preferred embodiment. As shown in FIG. 3, the optical disk drive 100 includes optical pickup 2, semiconductor laser controller 1, servo processor 21, read signal processor 7 and central processing unit (CPU) 10. The optical pickup 2 reads and writes data from/on an optical disk 4 and includes a semiconductor laser driver 3 and a photodetector section 5. The semiconductor laser controller 1 and servo processor 21 control the operation of the optical pickup 2. The read signal processor 7 processes read signals that have been supplied from the optical pickup 2 and includes a pre-pit signal detector 8 and a data detector 9. And the CPU 10 controls all of these blocks.

Hereinafter, it will be described how the optical disk drive 100 detects the pre-pits and the wobble patterns of the grooves on the optical disk 4.

In accordance with the optical power that has been defined for a readout light beam by the semiconductor laser controller 1, the semiconductor laser driver 3 determines the drive current of a semiconductor laser diode (not shown) included in the optical pickup 2. In this manner, the optical pickup 2 irradiates the optical disk 4 with a light beam having a predetermined laser power, thereby forming a light spot on a track (e.g., groove in this preferred embodiment) of the optical disk 4 as shown in FIG. 1 or 4A.

Figure 4:
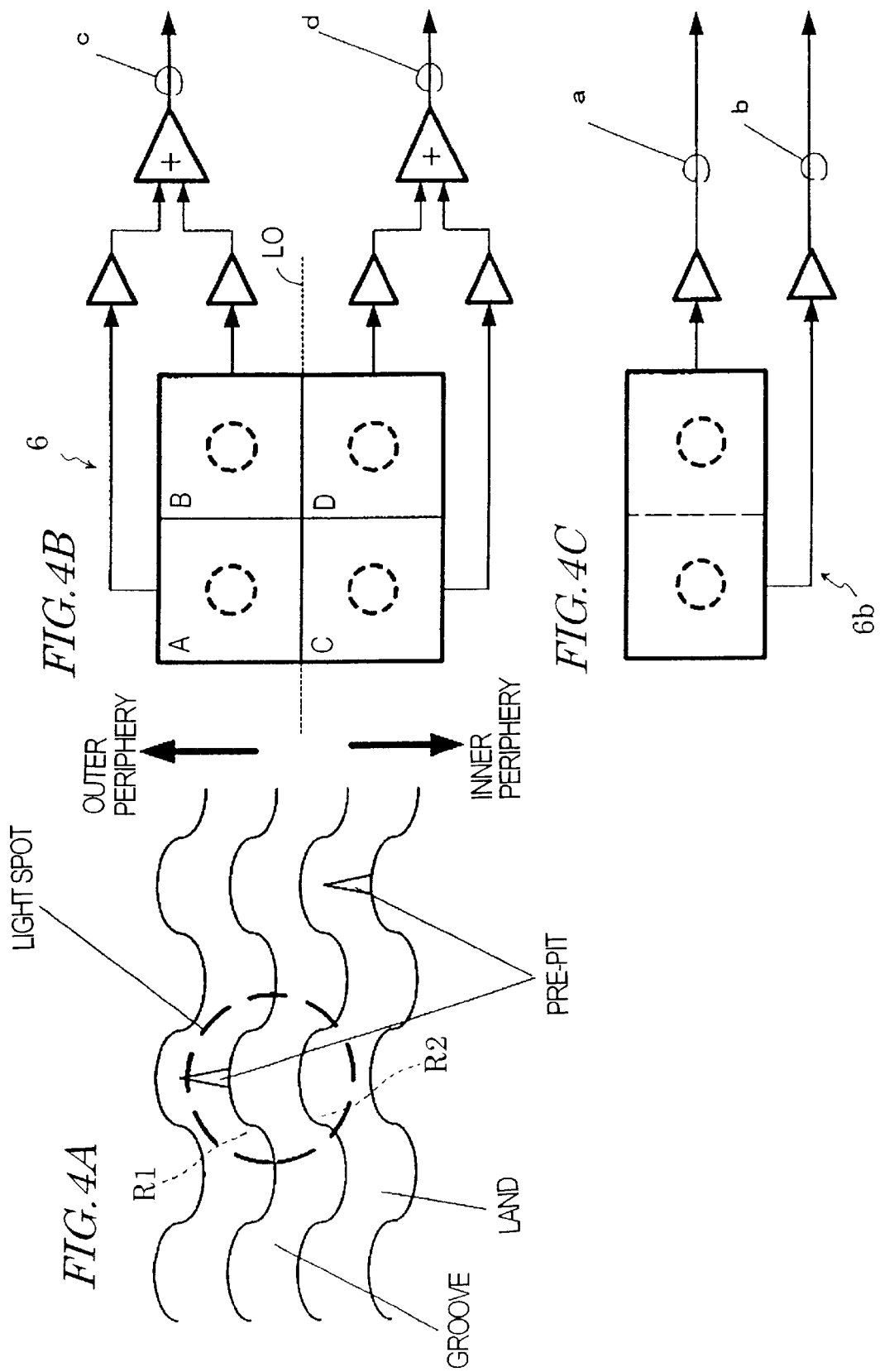
FIGS. 4A, 4B and 4C illustrate how reflected light is detected by the optical disk drive shown in FIG. 3.

The light beam that has been irradiated from the optical pickup 2 is reflected from the optical disk 4 and then received and detected by a photodetector 6 included in the photodetector section 5 of the optical pickup 2 as shown in FIG. 4B. The photodetector 6 includes at least two photodiodes that are arranged to detect the reflected light beam and cross the longitudinal direction of the grooves (i.e., track direction) at right angles. That is to say, these photodiodes are arranged in the radial direction of the disk 4. More particularly, the photodetector 6 includes four photodiodes (or light detecting portions) A, B, C and D in this preferred embodiment. As shown in FIG. 4B, the photodiodes A and B are disposed closer to the disk outer periphery with respect to the centerline LO of the track, while the photodiodes C and D are disposed closer to the disk inner periphery with respect to the centerline LO of the track. Also, the light beam to be detected by the photodiodes A through D of this photodetector 6 has been reflected not only from the groove on which the light spot has been formed but also from the lands adjacent to the groove and from the pre-pits formed on the adjacent lands.

Thus, as shown in FIG. 4A, the photodetector 6 having such a configuration can separately detect light that has been reflected from one side edge R1 of the groove and light that has been reflected from the other side edge R2 of the groove. These edges are located closer to the disk outer periphery and the disk inner periphery, and will be herein referred to as "outer side edge" R1 and "inner side edge" R2, respectively. As used herein, a "side edge" of a groove refers to a zone surrounding the side edge (i.e., a boundary zone between the groove and a land adjacent to the groove) and may include the adjacent land.

In this preferred embodiment, the photodetector 6 is supposed to detect the light that has been reflected from one side edge of a track and the light that has been reflected from the other side edge thereof for the sake of simplicity. Actually, though, the photodetector 6 does not have to detect the light that has been reflected from both of these edges. The photodetector 6 has only to detect the asymmetric intensity distribution of the light that has been reflected from the optical disk (i.e., the asymmetry with respect to the centerline of the track when the wobble is not taken into consideration) and thereby obtain a signal representing the asymmetry of the track shape. A photodetector having such a function is herein referred to as a "photodetector for detecting the light that has been reflected from one and the other side edges of a track" for convenience sake.

As shown in FIG. 4B, in the photodetector section 5, the light that has been detected by the photodetector 6 is converted photoelectrically into tracking detection signals c and d by adding up the outputs of the photodiodes A and B and the outputs of the photodiodes C and D, respectively. These tracking detection signals c and d correspond to the light reflected from the outer side edge R1 of the groove and the light reflected from the inner side edge R2 thereof, respectively. Also, the light that has been reflected from the groove and detected by a photodetector 6b shown in FIG. 4C is converted into focus detection signals a and b. These detection signals a, b, c and d are input to the servo processor 21 as shown in FIG. 3. The servo processor 21 generates a focus control signal e from the focus detection signals a and b and a tracking control signal f from the tracking detection signals c and d, respectively. These control signals e and f are output to the optical pickup 2, thereby controlling the optical pickup 2 in such a manner that the optical pickup 2 can focus the laser beam on the track of the optical disk 4 accurately and follow the intended track on the disk 4. It should be noted that these focus and tracking controls may be performed by known techniques.

The detection signals a, b, c and d, output from the photodetector section 5, are also input to the data detector 9 of the read signal processor 7. In accordance with these detection signals a, b, c and d, the data stored on the optical disk 4 can be read out. Among these output detection signals a, b, c and d of the photodetector section 5, the tracking detection signals c and d, representing the intensity of the light reflected from the outer side edge R1 of the track and that of the light reflected from the inner side edge R2 thereof, respectively, are also input to the pre-pit signal detector 8 of the read signal processor 7. As will be described in detail later, the pre-pit signal detector 8 detects the pre-pits and the wobble patterns of the groove on the optical disk 4 in accordance with the detection signals c and d. It should be noted that the operations of the semiconductor laser controller 1, servo processor 21 and read signal processor 7 are controllable in response to control signals g, h, i and j supplied from the CPU 10. Alternatively, these processors and controllers 1, 21 and 7 are also controllable in response to a control signal k that has been supplied from an external computer (not shown) by way of the CPU 10.

The pre-pit signal detector 8 will be described in further detail.

Figure 5:
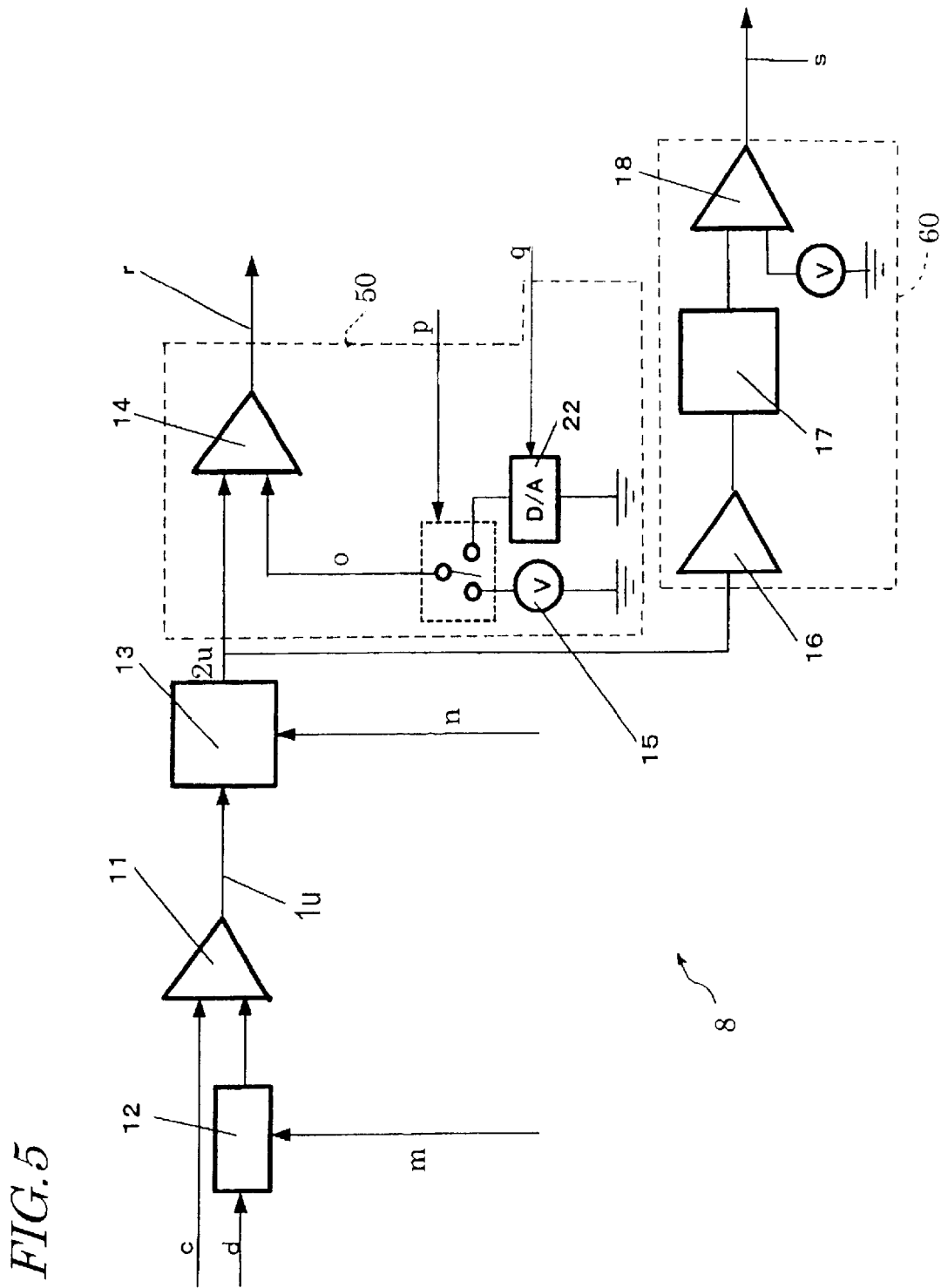
FIG. 5 is a block diagram showing a detailed configuration of the pre-pit signal detector in the optical disk drive shown in FIG. 3.

FIG. 5 illustrates an overall configuration for the pre-pit signal detector 8. As shown in FIG. 5, the detection signals c and d, corresponding to the outer and inner side edges R1 and R2 of the groove, are input to a subtractor 11. The subtractor 11 performs subtraction on these signals c and d, thereby generating a differential signal 1$u$ such as that shown in FIG. 2. The pre-pit signal detector 8 further includes a gain balance controller 12 that can adjust the gain of the detection signal d yet to be input to the subtractor 11. Thus, the gain balance controller 12 can control the balance between the two detection signals c and d, thereby adjusting the subtraction ratio at the subtractor 11. The gain balance controller 12 adjusts the gain of the detection signal d in response to a gain balance control signal m. This operation will be described in further detail later.

The differential signal 1$u$, output from the subtractor 11, is then input to a gain amplifier 13. This gain amplifier 13 is so constructed as to amplify the input differential signal 1$u$ with an arbitrary gain in response to a gain amplifier control signal n (i.e., to amplify the differential signal 1$u$ by a variable amplification factor). As a result, a differential signal 2$u$ amplified by a predetermined amplification factor can be obtained. In this manner, according to this preferred embodiment, the differential signal 1$u$ is appropriately amplified by the gain amplifier 13, thereby increasing the pre-pits detection accuracy. The operation of the gain amplifier 13 will be described in further detail later.

The differential signal 2$u$, output from the gain amplifier 13, is then input to a pre-pit detecting section 50 and a wobble detecting section 60 for detecting the pre-pits and the wobble patterns of the groove, respectively.

In the pre-pit detecting section 50, a digitizer 14 receives the differential signal 2$u$ and slices it at a level defined by a slice signal o, thereby digitizing the differential signal 2$u$. The digitized differential signal is output as a pre-pit digital signal r to the CPU 10. In response to a slice signal selection signal p, a selector selects, as the slice signal o, either the output of a constant voltage generator 15 or the output of a D/A converter 22. The output of the D/A converter 22 may be set equal to an arbitrary level, which is controllable in accordance with a slice level setting signal q.

In the wobble detecting section 60 on the other hand, a wobble gain amplifier 16 with an arbitrary gain receives the differential signal 2$u$ and amplifies the signal 2$u$. Next, a band-pass filter 17 extracts only the fundamental wave component of a wobble signal from the output signal of the wobble gain amplifier 16. As a result, the noise components other than the fundamental wave component are removed from the wobble signal. The noise components of this wobble signal include a read signal representing the data written and a pre-pit signal. After having been passed through the band-pass filter 17, the wobble signal is digitized by a wobble digitizer 18 so as to be input as a wobble digital signal s to the CPU 10 as well as the pre-pit digital signal r.

In this manner, the optical disk drive 100 of this preferred embodiment detects the pre-pits and the wobble patterns from the differential signal 2$u$ representing the difference between the detection signals c and d. The optical disk drive 100 can detect the pre-pits much more accurately by getting the gain, balanced gain and slice level defined by the gain amplifier 13, gain balance controller 12 and digitizer 14, respectively. More specifically, first, the differential signal is amplified by the gain amplifier 13 in such a manner that the pre-pit signal component of the differential signal is detectable most easily. Thereafter, the amplified differential signal has its waveform and digitizing slice level controlled by the gain balance controller 12 and the digitizer 14, respectively. As a result, the optical disk drive 100 can detect the pre-pit highly accurately.

Hereinafter, it will be described specifically how the gain amplifier 13 defines the gain. As shown in FIG. 1, a pre-pit on the optical disk 4 can be detected by detecting the reflected light beam that has formed a light spot on a groove. In this technique of detecting a pre-pit, if the pre-pit is relatively small compared with the light spot, then the differential signal 1$u$ shown in FIG. 5 (i.e., the pre-pit signal) is likely to have small amplitude. Conversely, if the pre-pit is relatively large compared with the light spot, then the pre-pit signal is likely to have large amplitude. This relationship is not always true because the amplitude of a pre-pit signal is changeable due to many other factors. However, if a given optical disk is combined with a different optical disk drive, then the size relationship between a pre-pit and a light spot also changes, thus varying the amplitude of the pre-pit signal. It should be noted that the amplitude of a pre-pit signal is variable with the shape of its associated pre-pit that has been formed on the optical disk 4, the reflectance of the material of a recording film that has been applied onto the optical disk 4 or the width of its associated groove or land track.

Figure 6A:
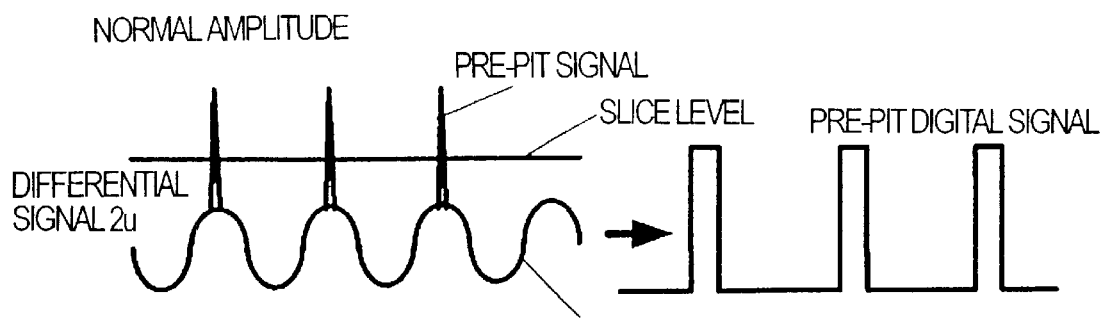
FIGS. 6A, 6B, 6C and 6D show how the pre-pit digital signal generated changes with the types of differential signals.
Figure 6B:
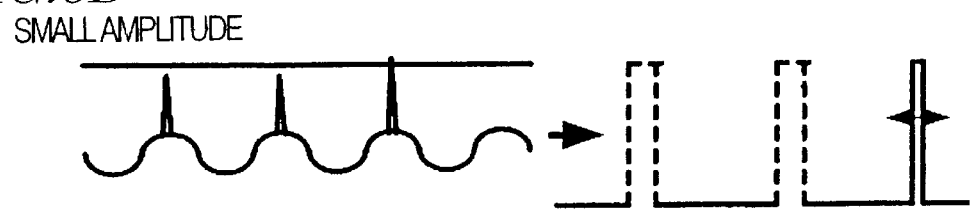
Figure 6C:
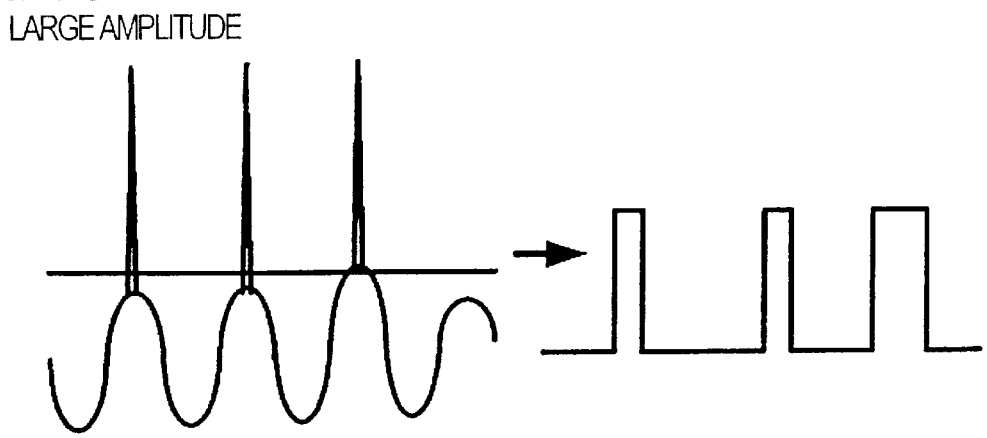

For these reasons, in a particular optical disk/optical disk drive combination, a pre-pit signal may have inappropriate amplitude and be detected much less accurately unless the amplification factor of its associated differential signal is adjusted. FIGS. 6A, 6B and 6C show respective pre-pit digital signals that have been generated from differential signals 2$u$ (i.e., signals each including a pre-pit signal component and a wobble signal component) with various amplitudes. If the differential signal 2$u$ has appropriate (or normal) amplitude as shown in FIG. 6A, a desired pre-pit digital signal can be obtained. However, if the differential signal 2$u$ has amplitude smaller than the normal amplitude as shown in FIG. 6B, then the amplitude of the pre-pit signal sometimes falls short of the slice level of the digitizer 14 and no pulse signal corresponding to such a pre-pit signal may be obtained. Also, even if the pre-pit signal can be detected, the pre-pit signal is still not sliced at the appropriate level. Thus, in the digital signal generated, each pulse representing the pre-pit may contain a lot of jitter.

On the other hand, if the differential signal 2u has amplitude greater than the normal amplitude as shown in FIG. 6C, then not only the pre-pit signal but also the wobble signal may be digitized unintentionally. Thus, the desired pre-pit digital signal cannot be obtained, either.

Figure 6D:
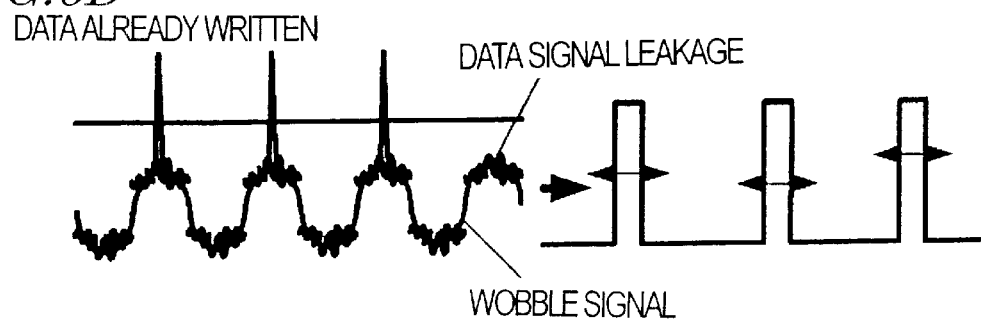

Furthermore, if data has already been written on a groove as shown in FIG. 6D, then the differential signal 2u is affected by a variation in reflectance due to the presence of recording marks. That is to say, a variation in reflectance like this constitutes a disturbance on the pre-pit signal and the wobble signal. Such a disturbance created by the data written on a groove will be herein referred to as a "data signal leakage". Accordingly, if the differential signal 2u has relatively large amplitude compared with the slice level, then the pre-pit signal may be detected erroneously or the jitter increases disadvantageously. The pre-pit digital signal is used as a sync signal in detecting an address on the optical disk 4. Thus, if a pre-pit cannot be detected successfully or if the jitter has increased, then accurate timing information cannot be obtained and the address cannot be detected as intended. A similar data signal leakage also occurs when a write laser beam, corresponding to the data to be written, is emitted in the write operation. In writing data on the optical disk, the pre-pit digital signal is used to detect an exact location on the optical disk. Accordingly, if an appropriate pre-pit digital signal cannot be obtained, then a recording mark cannot be formed at the desired location within the predetermined sector on the optical disk.

Figures 7A, 7B:
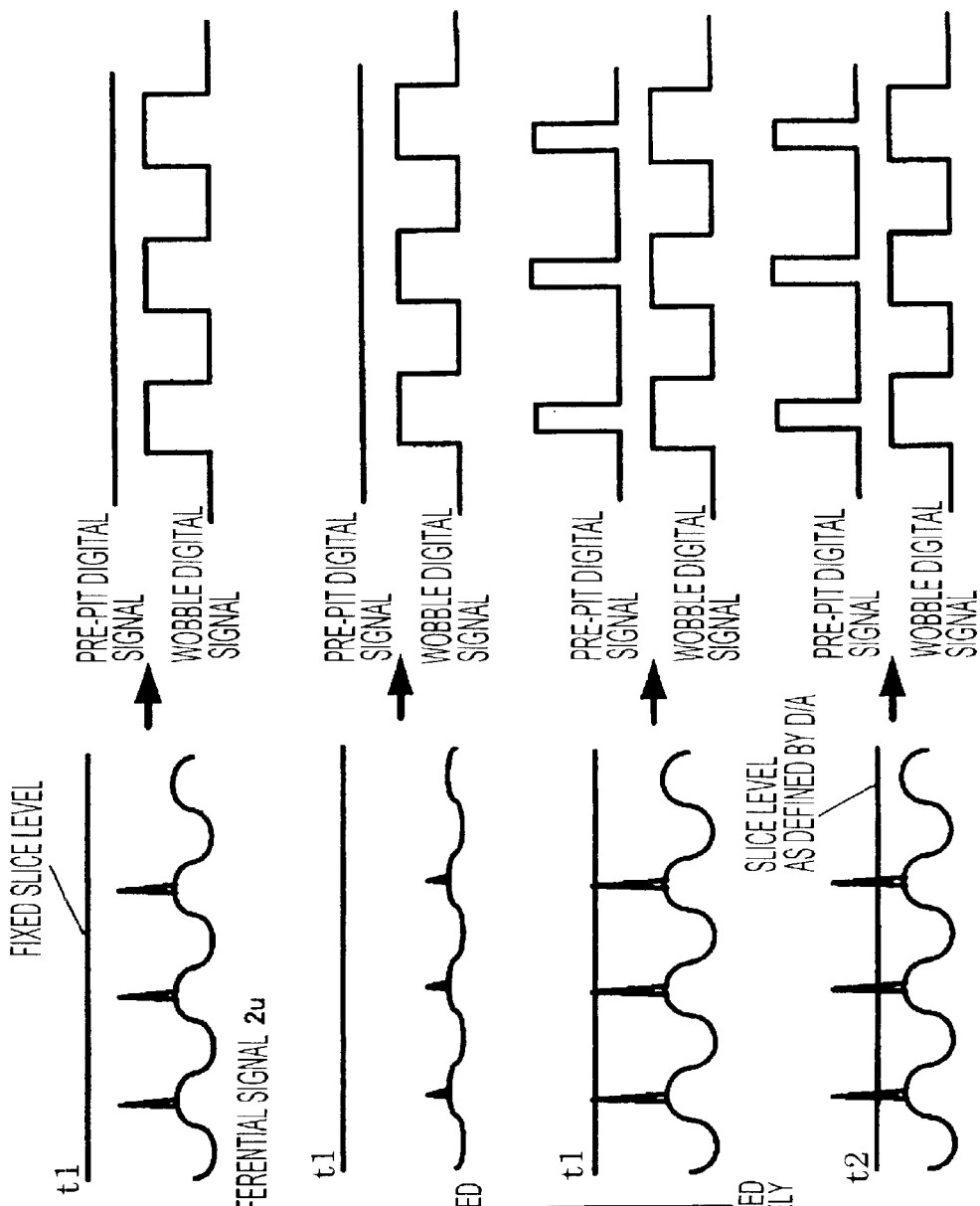
FIGS. 7A and 7B show how the optical disk drive shown in FIG. 3 defines the gain.

In view of these considerations, particularly when an optical disk is loaded into the optical disk drive, the amplitude of the pre-pit signal (i.e., the amplitude of the differential signal 1u) is preferably adjusted appropriately in such a manner to detect the pre-pit as intended. FIG. 7A is a flowchart showing how the gain amplifier 13 of this preferred embodiment adjusts the amplitude of the differential signal 1u. FIG. 7B shows relationships between the differential signal and the slice signal in the respective processing steps and also shows the pre-pit and wobble digital signals generated in those processing steps.

The amplitude of the differential signal 1u starts to be adjusted in Step S10. In Step S10, the signal level of the slice signal o (i.e., the slice level) is set equal to a fixed level t1 that has been defined by the constant voltage generator 15 in response to the slice signal selection signal p. This fixed slice level t1 is preferably defined at a level around the upper limit of the dynamic range of the digitizer 14 that digitizes the pre-pit signal (i.e., near the maximum definable slice level).

Next, in Step S12, the gain of the gain amplifier 13 is set equal to a minimum gain value in response to the gain amplifier control signal n. If the gain amplifier 13 has the minimum gain, the amplitude of the pre-pit signal in the differential signal falls short of the slice level t1. Accordingly, no pulses representing the pre-pits appear in the pre-pit digital signal to be generated by the digitizer 14.

Subsequently, in Step S14, the gain of the gain amplifier 13 is gradually increased responsive to the gain amplifier control signal n, thereby amplifying the differential signal. In this processing step, when the amplitude of the differential signal amplified reaches the slice level, pulses appear in the pre-pit digital signal. These pulses will be herein referred to as "pre-pit detection pulses". At this point in time, it is determined whether or not these newly appearing pulses represent the pre-pits that have been actually formed on the optical disk. This decision is made by a pre-pit detection decision circuit 19 included in the CPU 10 as shown in FIG. 8A.

Figure 2:
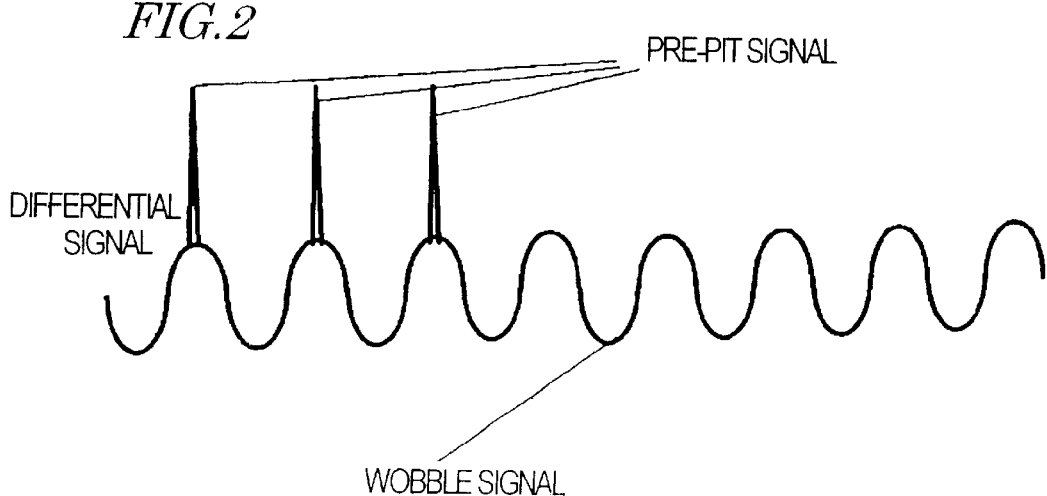
FIG. 2 shows a waveform of a differential signal consisting of a pre-pit signal and a wobble signal to be detected from an optical disk.

As shown in FIG. 8A, the pre-pit detection decision circuit 19 receives the pre-pit digital signal r and the wobble digital signal s from the digitizer 14 and the wobble digitizer 18, respectively. In this preferred embodiment, the format of the optical disk is defined such that the pre-pit signal and the wobble signal are synchronized with each other as shown in FIG. 2. Accordingly, it is expected that each pre-pit detection pulse of the pre-pit digital signal r appears synchronously with an associated pulse of the wobble digital signal s. Furthermore, the format of the optical disk is defined such that the pre-pit signal is generated to meet a predetermined relationship with the wobble signal. Thus, it is possible to generate a pre-pit predicted signal v, representing the expected positions of the pre-pit detection pulses, from the wobble digital signal s as shown in FIG. 8B. In this preferred embodiment, each pulse of the pre-pit predicted signal v rises approximately synchronously with the center of its associated logic high-level interval of the wobble digital signal s. As shown in FIG. 8B, each pulse of the pre-pit predicted signal v is narrower in width than each logic high-level interval of the wobble digital signal s.

The pre-pit detection decision circuit 19 compares the input pre-pit digital signal r with the pre-pit predicted signal v, thereby determining whether or not the pre-pit detection pulses correspond to the actual pre-pits. More specifically, if a pre-pit detection pulse of the pre-pit digital signal r is detected on the leading edge of a pulse of the pre-pit predicted signal v, then the pre-pit detection pulse is regarded as a normal (or valid) pre-pit detection pulse. On the other hand, if a pre-pit detection pulse of the pre-pit digital signal r is detected when there is no pulse of the pre-pit predicted signal v, then it is determined that a pre-pit has been detected erroneously due to noise, for example. When the pre-pit detection decision circuit 19 has detected a predetermined number of normal pre-pit detection pulses in this manner, the pre-pit detection decision circuit 19 will make a decision that the pre-pits have been detected appropriately and notify the gain amplifier 13 that the amplified differential signal 2u is appropriate.

The gain amplifier 13 goes on increasing the gain gradually until the pre-pit detection decision circuit 19 sends such notice to the gain amplifier 13. And on receiving the notice, the gain value at that time is defined as the optimum gain value of the gain amplifier 13. In this manner, the gain of the gain amplifier 13 is defined by the output of the pre-pit detection decision circuit 19 that determines whether or not a pre-pit signal component of the differential signal corresponds to the actual pre-pits.

Once the optimum gain value of the gain amplifier 13 has been defined in this manner, the output of the D/A converter 22 is selected as the slice signal o in Step S16 in response to the slice signal selection signal p, thereby defining the slice level of the digitizer 14. The slice level, defined by the D/A converter 22 in response to the slice level setting signal q, is lower than the voltage level defined by the constant voltage generator 15, and is preferably around an intermediate level of the dynamic range of the digitizer 14. It should be noted that the slice level defined by the D/A converter 22 is further adjustable if necessary as will be described later.

As described above, by getting the differential signal 1u pre-amplified appropriately by the gain amplifier 13, it is possible to avoid the unwanted situation where the amplitude of the differential signal 2u to be digitized by the digitizer 14 is too much smaller or larger than the slice level as shown in FIG. 6B or 6C, irrespective of the amplitude of the differential signal 1u that has been generated by the subtractor 11. Particularly, if the differential signal 1u has been amplified to such an extent that the peak level of the pre-pit signal is approximately equal to the maximum slice level, then the pre-pit signal can be sliced at an appropriate level by setting the slice level at an intermediate level, for example, during the digitization. As a result, the pre-pits can be detected much more accurately.

It should be noted that while the gain is defined for the gain amplifier 13, the light beam that has been reflected from a predetermined area on the optical disk 4 is detected (i.e., information is read from the predetermined area of the disk 4). As shown in FIG. 9A, if information is read from an unrecorded area in which no data has been written yet, then the reflectance of the light beam is not varied by any recording mark and the amplitude of the pre-pit signal is not decreased and can be detected constantly. Accordingly, if the gain of the gain amplifier 13 is defined while information is read out from an unrecorded area, then no serious problem will be caused even when information is read out from a recorded area in which data has already been written.

In contrast, if the gain of the gain amplifier 13 is defined while information is read out from a data recorded area as shown in FIG. 9B, then the reflectance of the light beam is varied by the recording marks and the detection signals are affected by the variation in reflectance. As a result, the pre-pit signal has an inconstant level and has its amplitude decreased. According to the gain that has been defined in such a situation, when information is read out from a data unrecorded area (i.e., when the detection signals are not affected by the variation in reflectance due to the presence of the recording marks), the pre-pit signal may have excessively large amplitude. In that case, even if the slice level is set lower than the fixed level, the pre-pits still cannot be detected at a higher percentage. As a result, the gain defined might be a non-optimum one.

In view of these considerations, the gain of the gain amplifier 13 is preferably defined in accordance with a differential signal that has been generated by reading information from a data unrecorded area (or a track portion). Then, the pre-pits can be detected accurately enough from both the recorded and unrecorded areas.

The optimum gain value that has been defined in this manner (i.e., the optimum amplification factor of the differential signal) may be stored on a storage device (memory) provided for the CPU 10. As described above, the amplitude of the pre-pit signal is variable with the combination of the optical disk 4 and a drive system such as the optical pickup 2. However, once the optimum gain value has been defined for an optical disk that has been loaded into an optical disk drive, the optimum gain value is effective for the disk until the disk is unloaded. Accordingly, when the optical disk drive, which was switched off with an optical disk loaded, is switched on next time without unloading the disk, the gain defining steps do not have to be performed all over again but only the optimum gain value needs to be read out from the memory. Optionally, not only the optimum gain value defined but also the identification information of the optical disk used (i.e., information that allows the optical disk drive to identify the particular disk from the other disks) may be stored on the memory. In that case, even if an optical disk, which has been once unloaded from an optical disk drive, is loaded again into the same disk drive, the optimum gain value of the disk can be retrieved quickly in accordance with its identification information stored.

Alternatively, the optimum gain value does not have to be stored on the memory but may be recorded in a control information area of the optical disk 4 by the optical pickup 2. In that case, even if an optical disk 4 is once unloaded from an optical disk drive, the optical disk drive has only to read the optimum gain value that has been recorded in the control information area of the optical disk 4 and output it to the gain amplifier 13. As a result, the optical disk drive system can be booted in a much shorter time. Furthermore, the identification information of the optical disk 4 may also be recorded along with the optimum gain value thereof in the control information area.

Next, it will be described how the gain balance controller 12 defines the balanced gain and the level of the slice signal o (i.e., the slice level).

FIG. 10 illustrates a pre-pit detection percentage calculator 20, which is included in the CPU 10 and which is used to define the balanced gain and the slice level. The pre-pit detection percentage calculator 20 receives the pre-pit digital signal r and the wobble digital signal s. Just like the pre-pit detection decision circuit 19, the pre-pit detection percentage calculator 20 determines whether or not the pre-pit signal included in the differential signal represents the actual pre-pits on the optical disk 4. More specifically, the pre-pit detection percentage calculator 20 also detects the normal pre-pit detection pulses from the pre-pit digital signal r. The pre-pit detection percentage calculator 20 always detects the normal pre-pit detection pulses and can calculate the percentage of the pre-pits that have been detected accurately.

Figure 11A:
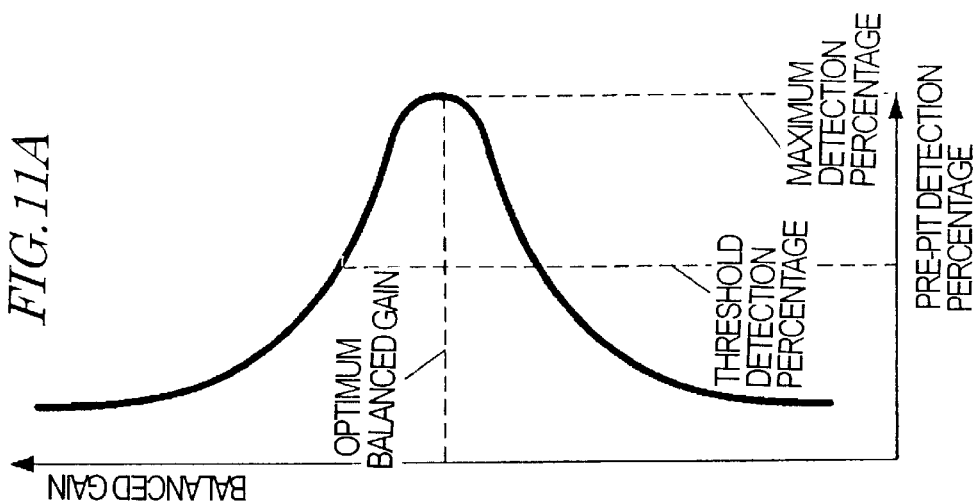
FIG. 11A is a graph showing a relationship between the balanced gain and the pre-pit detection percentage in the optical disk drive shown in FIG. 3.
Figure 11B:
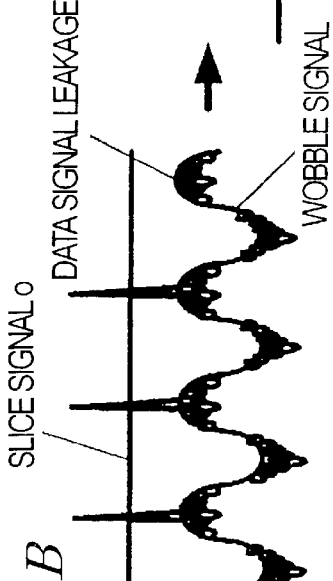
FIGS. 11B, 11C and 11D show how the waveforms of the differential signal and pre-pit digital signal change with the balanced gain adopted.

FIG. 11A shows the pre-pit detection percentages obtained by changing the gain value of the gain balance controller 12 (i.e., the amplification factor of the detection signal d) while information is read out from a data recorded area of the optical disk 4. A recording mark and space that have been formed on a groove of the optical disk 4 appear as data signals of the same phase on the tracking detection signals c and d, respectively. Accordingly, in generating a differential signal representing the difference between these tracking detection signals c and d, these data signals are canceled to affect the pre-pit signal and the wobble signal to a lesser degree. However, if the balance between these detection signals c and d is an unsuitable one, then these data signals of the same phase are not canceled completely, thus affecting the pre-pit and wobble signals to a non-negligible degree. As a result, the pre-pit digital signal r generated by the digitizer 14 has its quality deteriorated to decrease the pre-pit detection percentage. FIGS. 11B and 11D show those unwanted situations where an inappropriate balance between the detection signals c and d has increased the data signal leakage too much to obtain the desired pre-pit digital signal r.

Figure 11C:
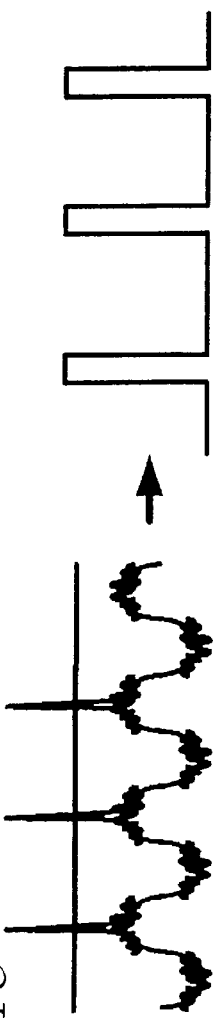
Figure 11D:
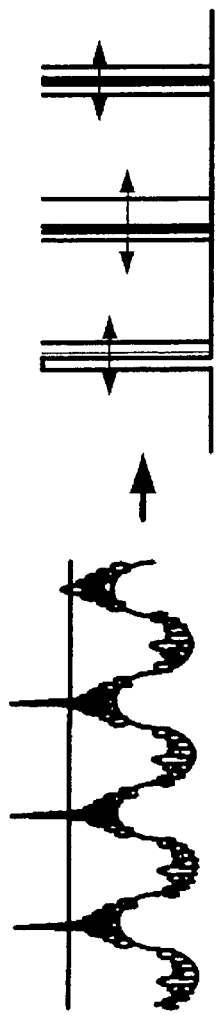

Accordingly, as shown in FIG. 11C, it is preferable to reduce the data signal leakage as much as possible by adjusting the gain value of the gain balance controller 12 and controlling the balance between the detection signals c and d appropriately. The gain of the gain balance controller 12 (which gain will be herein referred to as a "balanced gain") may be defined as a gain value corresponding to the highest pre-pit detection percentage that has ever been output from the pre-pit detection percentage calculator 20. Alternatively, a threshold value may be defined for the pre-pit detection percentages output from the pre-pit detection percentage calculator 20. In that case, the gain of the gain balance controller 12 may be an intermediate value between two gain values exceeding the threshold value.

In the same way, as shown in FIGS. 12A through 12D, an optimum slice level is also preferably defined by gradually changing the levels of the slice signal o from a lower level to a higher level while information is read out from a data recorded area of the optical disk 4. This operation may be performed by selecting the output of the D/A converter 22 as the slice signal o in response to the slice level setting signal q and by getting the pre-pit detection percentages calculated by the pre-pit detection percentage calculator 20 with the output of the D/A converter 22 changed. As shown in FIG. 12B, while the slice level is relatively low, the pre-pit signal is digitized around the base level thereof, and the resultant pre-pit detection percentage is low. On the other hand, as the slice level is getting closer to the intermediate level of the pre-pit signal, the pre-pit detection percentage gradually increases as shown in FIG. 12C. However, once the slice level has exceeded a predetermined level, the pre-pit detection percentage decreases gradually. Thus, as shown in FIG. 12D, if the slice level is too high, the pre-pit detection percentage is very low. By performing these processing steps, the slice level may be defined either as a level at which the pre-pit detection percentage reaches its maximum value or as an intermediate level between two slice levels at which the pre-pit detection percentages exceed a predetermined threshold value.

Figure 13:
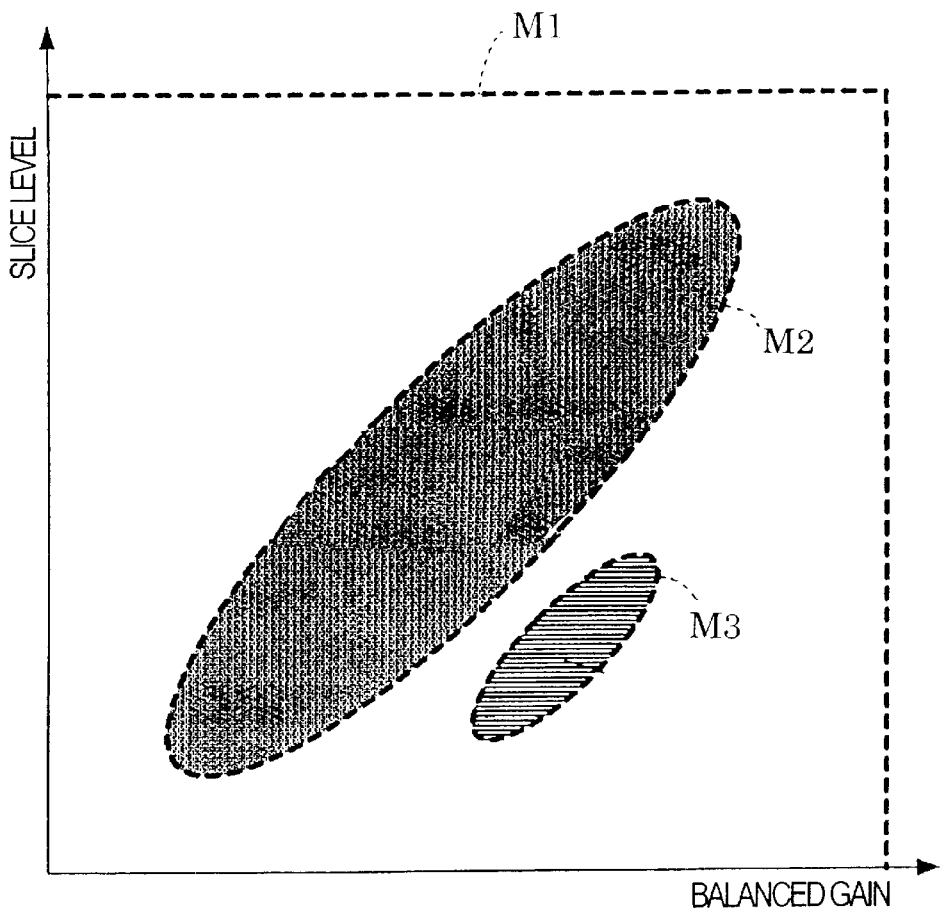
FIG. 13 is a graph showing pre-pit detection margins defined by the balanced gain and the slice level in the optical disk drive shown in FIG. 3.

FIG. 13 shows ranges where the pre-pits can be detected effectively, which ranges will be herein referred to as "pre-pit detection margins". In FIG. 13, the abscissa represents the balanced gain while the ordinate represents the slice level. When information is read out from a disk area (i.e., a groove) in which no data has been written yet (i.e., a data unrecorded area), the detection margin is relatively great as indicated by the range M1 no matter how much the balanced gain or the slice level changes. On the other hand, when information is read out from a disk area in which data has already been written (i.e., a data recorded area), it is a different story as described above. In that case, if the balanced gain is an appropriate value, then the variation in reflectance due to the presence of the recording marks is regarded as a signal of the same phase and can be removed from the differential signal. However, if the balance is lost, the data signal leakage increases as shown in FIGS. 11A through 11D. For that reason, the balanced gain-slice level range M2, in which the pre-pits can be detected constantly from the tracks where data has already been written, is much narrower than the range M1 corresponding to the tracks where no data has been written yet. Accordingly, to detect the pre-pits constantly, the optimum balanced gain and optimum slice level are preferably defined by reading information from the grooves in which data has already been written and which allow the narrow pre-pit detection margin. Then, the pre-pits can be detected accurately enough no matter whether information is read out from the data recorded area or the data unrecorded area.

FIG. 13 also shows how the pre-pit detection margin M3 is defined by the balanced gain and the slice level while predetermined data is being written on the optical disk. As can be seen from FIG. 13, the pre-pit detection margin M3 during the data write operation is even narrower than the detection margins M1 and M2 during the read operation. This is because during the write operation, a laser beam that has been modulated for the shape of the mark to be recorded is emitted from the optical pickup 2. The laser beam emitted may have a waveform such as that shown in FIG. 14. If the emission intensity of the laser beam is changed in this manner, then the intensity of the reflected laser beam to be detected by the photodetector also changes. As a result, the waveform of the laser beam emitted leaks into the resultant differential signal 2u as shown in FIGS. 15B through 15D.

Theoretically speaking, the waveform of the laser beam emitted should also appear as a signal of the same phase in the detection signals c and d, and therefore should be canceled in the differential signal 2u in an ideal situation. Actually, though, it is difficult to eliminate this leakage of the laser beam waveform completely. Furthermore, the leakage of the laser beam waveform during the write operation is greater than the data signal leakage while information is read out from a track on which data has already been written. For these reasons, to detect the pre-pits accurately, the balanced gain and the slice level should be defined even more appropriately, thus further narrowing the margins of the balanced gain and the slice level.

Figure 14:
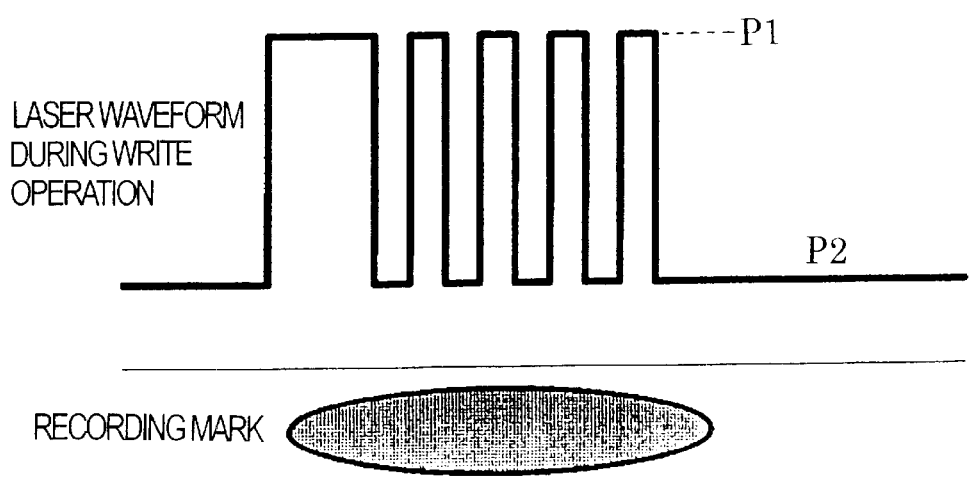
FIG. 14 shows the waveform of a laser beam emitted and a recording mark formed by the optical disk drive shown in FIG. 3 during a write operation thereof.

One of the reasons why the leakage of the laser beam waveform is great may be the big difference between the recording power level P1 and the bottom power level P2 in the laser beam waveform as shown in FIG. 14. In a DVD-R, for example, the ratio of the recording power level P1 to the bottom power level P2 is normally set equal to 10 or more. If the intensity of the laser beam emitted changes as drastically as such, then the differential signal is affected by the change significantly.

Also, the present inventors discovered and confirmed via experiments that where the leakage is so much great, the leakage cannot be eliminated completely even by adopting the equally balanced gain as shown in FIG. 15C but the pre-pit detection percentage is rather increased by defining an imbalanced gain on purpose as shown in FIG. 15D. As can be seen from FIGS. 11A and 15A, the relationship between the balanced gain and the pre-pit detection percentage during the write operation is different from their relationship during the read operation.

In view of these considerations, when the pre-pit signal is detected during the write operation, the optimum balanced gain and optimum slice level are preferably defined as different ones from those during the read operation. The optical disk drive 100 of this preferred embodiment can separately define different balanced gains and slice levels for the read and write operations in accordance with the pre-pit detection percentages supplied from the pre-pit detection percentage calculator 20. Thus, this optical disk drive 100 can detect the pre-pits accurately enough in both of these situations.

It should be noted that the balanced gain and the slice level may be adjusted for a data unrecorded area of the optical disk 4 but are preferably controlled for a data recorded area thereof. As described above, the pre-pit detection percentage is sometimes affected by a data signal leakage resulting from the variation in reflectance that has been caused by a recording mark. Accordingly, if the balanced gain and the slice level are adjusted for a data recorded area, these adjustments should be carried out under tougher conditions to detect the pre-pits accurately. Thus, once these adjustments have been done for a data recorded area, the pre-pits should be detected much more easily for a data unrecorded area.

Also, the optimum balanced gain and slice level values that have been defined in this manner may be either stored on the memory of the CPU 10 or recorded in the control information area of the optical disk 4 just like the gain value of the gain amplifier 13. In any case, the identification information of the optical disk 4 may also be stored on the memory of the optical disk drive or recorded on the optical disk. Then, the optical disk drive can be booted in a shorter time effectively.

The preferred embodiment of the present invention described above relates to a method of adjusting the balanced gain and the slice level. Hereinafter, an optimum point estimation method will be described as a simplified method of adjusting the balanced gain and slice level.

Figure 16:
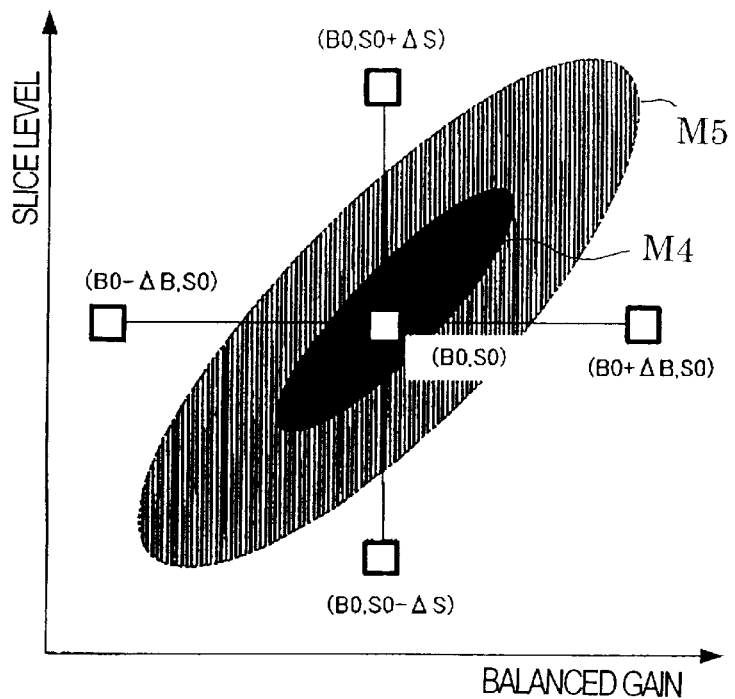
FIG. 16 is a graph showing how the optical disk drive shown in FIG. 3 selects an optimum combination of balanced gain and slice level.

FIG. 16 shows another method of adjusting the balanced gain and slice level. As shown in FIG. 16, when the pre-pit detection percentages are represented by the relationship between the balanced gain and the slice level, the pre-pit detection percentages have a contoured distribution. More specifically, a balanced gain-slice level range M4 in which the desired pre-pit detection percentages are achieved is surrounded with another range M5 in which the pre-pit detection percentages are lower. In the following description, each balanced gain value (e.g., B0) is represented as an abscissa, each slice level value (e.g., S0) is represented as an ordinate, and a combination thereof is denoted by (B0, S0), for example.

First, a pre-pit detection percentage D (B0, S0), defined by a combination of predetermined initial balanced gain and slice level values (B0, S0), is calculated. In this specific example, D (B0, S0) is supposed to be 100%. It should be noted that the pre-pit detection percentage may be calculated by the pre-pit detection percentage calculator 20 shown in FIG. 10. More specifically, the pre-pit detection percentage is calculated as a ratio of the number of pre-pits, which have been actually counted by the pre-pit detection percentage calculator 20, to the total number of pre-pits that should be detected.

Next, the pre-pit detection percentages are calculated by changing the balanced gain by $\pm\Delta B$ and the slice level by $\pm\Delta S$ from the initial value combination (B0, S0). It should be noted that $\Delta B$ and $\Delta S$ are predetermined differences and will be herein referred to as a "balanced gain difference" and a "slice level difference", respectively. In this method, the balanced gain and the slice level are not changed continuously from the initial values (B0, S0) but discretely, and the pre-pit detection percentages are calculated at the discrete points. Suppose the calculation results are: D (B0+$\Delta B$, S0)=20%; D (B0−$\Delta B$, S0)=10%; D (B0, S0+$\Delta S$)=20%; and D (B0, S0−$\Delta S$)=10%.

In this specific example, the pre-pit detection percentage D (B0, S0) defined by the initial values (B0, S0) is the highest. Accordingly, it can be seen that the optimum balanced gain and slice level values may be set equal to their initial values (B0, S0).

Figure 17:
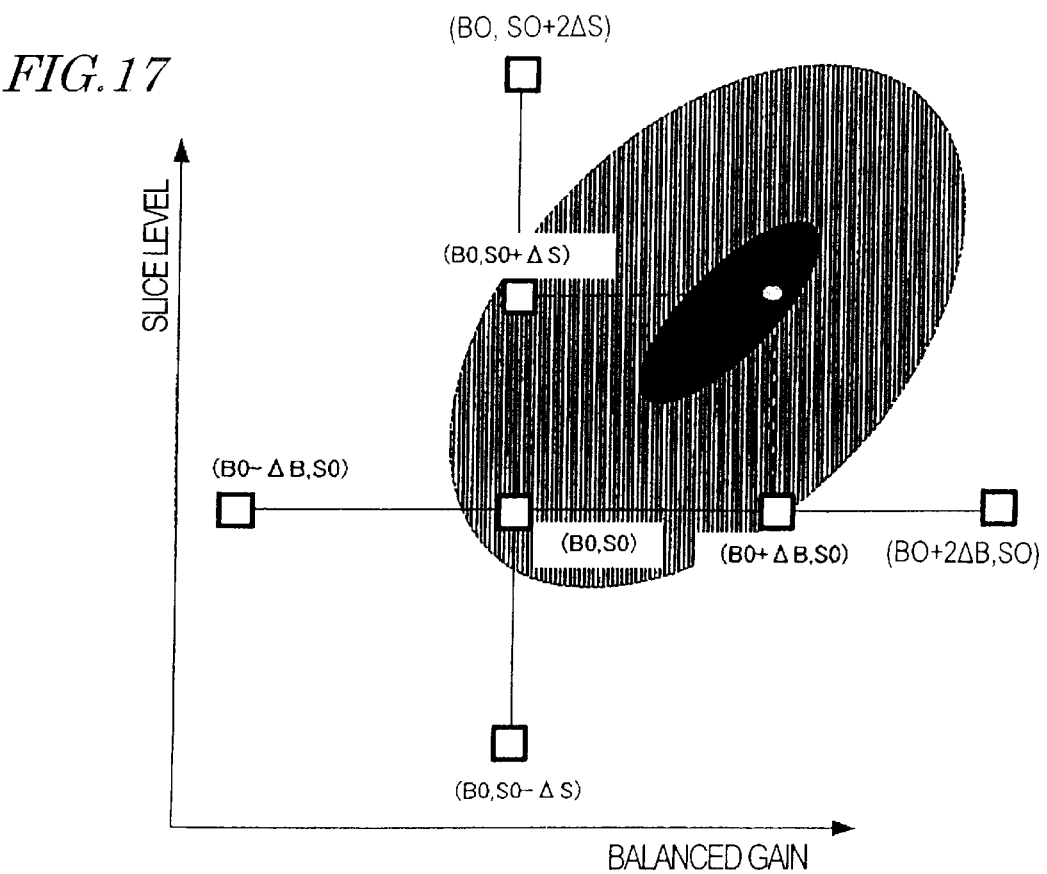
FIG. 17 is a graph showing how the optical disk drive shown in FIG. 3 selects an optimum combination of balanced gain and slice level.

Next, it will be described with reference to FIG. 17 how to define the optimum balanced gain and slice level values if the initial values (B0, S0) are not the optimum values unlike the situation shown in FIG. 16. Suppose the pre-pit detection percentages are calculated as in the previous specific example and the results are: D(B0, S0)=50%; D(B0−$\Delta B$, S0)=0%; D (B0+$\Delta B$, S0)=60%; D (B0, S0+$\Delta S$)=60%; and D (B0, S0−$\Delta S$)=0%.

In this specific example. D (B0, S0) is greater than D (B0−$\Delta B$, S0) and D (B0, S0−$\Delta S$). Thus, it can be seen that the pre-pit detection percentage drops if the balanced gain or the slice level is decreased, or changed in the negative direction. As a result, it is confirmed that the optimum point does not exist in the negative directions but that the optimum balanced gain and the optimum slice level should both exist in the positive directions.

Subsequently, the pre-pit detection percentages are calculated by further increasing the balanced gain and the slice level (i.e., further changing these values in the positive directions). That is to say, D (B0+2$\Delta B$, S0) and D (B0, S0+2$\Delta S$) are calculated. Suppose the results are D (B0+2$\Delta B$, S0)=20% and D (B0, S0+2$\Delta S$)=20%. In both of these cases, the pre-pit detection percentages decrease. Thus, it is estimated that the pre-pit detection percentage will be the highest when the balanced gain is equal to B0+$\Delta B$ and when the slice level is equal to S0+$\Delta S$. As a result, the optimum combination of the balanced gain and the slice level is estimated as (B0+$\Delta B$, S0+$\Delta S$).

In this specific example, the inflection points at which the pre-pit detection percentages start to decrease are found when the balanced gain and the slice level are increased to B0+2$\Delta B$ and S0+2$\Delta S$, respectively. If the inflection points still cannot be found by doing so, then the balanced gain and the slice level may be further increased to B0+3$\Delta B$ and S0+3$\Delta S$ and so on to find the points.

Also, if no pre-pit detection percentage inflection point is found yet but if the pre-pit detection percentage has already reached a predetermined permissible value, then the balanced gain and the slice level may be adopted as the optimum values. Also, in this preferred embodiment, the calculating points are selected by fixing one of the balanced gain and the slice level and changing the other. Alternatively, the calculating points may also be selected with both of the balanced gain and the slice level changed at a time.

It should be noted that the step width $\Delta B$ of the balanced gain (i.e., the balanced gain difference) and the step width $\Delta S$ of the slice level (i.e., the slice level difference) are preferably as small as possible to estimate the optimum point precisely enough. However, if these step widths are too small, then the number of processing steps needed to find the optimum point increases too much, thus requiring an excessive amount of search time. Therefore, the balanced gain difference and the slice level difference are preferably optimized through experiments.

In the optimum point estimation method described above, appropriate balanced gain and slice level can be found by calculating the pre-pit detection percentages at a relatively small number of points, thus shortening the processing time advantageously. Suppose the initial values (B0, S0) are pre-defined at appropriate values via experiments in a manufacturing factory of the optical disk drive and then the optical disk drive is shipped from the factory and operated actually. In that case, even if the optimum values have varied from those defined for the optical disk drive yet to be shipped due to various factors including changes in characteristic of the disk to be used or the disk drive with time or temperature, those variations may be corrected by the method described above. Then, the balanced gain and the slice level may be defined in a short time.

In the optical disk drive according to various preferred embodiments of the present invention described above, the order in which the balanced gain and the slice level are adjusted is not particularly limited. Also, the balanced gain and the slice level may be adjusted in parallel with each other. As another alternative, either the balanced gain or the slice level may be adjusted selectively.

The optical disk drive according to various preferred embodiments of the present invention described above can amplify a differential signal, generated from a reflected light beam, by an arbitrary factor in detecting pre-pits. Accordingly, the optical disk drive can detect the pre-pits accurately enough by amplifying the differential signal appropriately. Also, the optical disk drive adjusts the balance between two detection signals that define the differential signal, thereby reducing the noise component of the differential signal. As a result, the optical disk drive can detect the pre-pits even more accurately. Furthermore, the optical disk drive can also improve the pre-pit detection accuracy by adjusting the slice level of a digitizer for use to digitize the differential signal.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disk drive for reading and/or writing data from/on an optical disk on which a pre-pit has been formed on at least one side edge of a data recording track, the disk drive comprising:
- a light-emitting element for emitting a light beam and irradiating the track of the optical disk with the light beam;
- a photodetector section for receiving and detecting the light beam that has been reflected from the track, thereby generating first and second detection signals based on the reflected light beam, the first and second detection signals carrying information about a shape of the track at the one side edge thereof and information about a shape of the track at the other side edge thereof, respectively;
- a subtractor for generating a differential signal representing a difference between the first and second detection signals; and
- an amplifier for amplifying the differential signal, which has been output from the subtractor, by a variable amplification factor and outputting an amplified differential signal,
- wherein the optical disk drive detects the pre-pit in accordance with the amplified differential signal.

2. The optical disk drive of claim 1, further comprising a pre-pit detection decision circuit for determining whether or not a signal component of the amplified differential signal representing the pre-pit corresponds to the pre-pit that has been actually formed on the optical disk,
- wherein the amplification factor is defined for the amplifier in accordance with the output of the pre-pit detection decision circuit.

3. The optical disk drive of claim 2, further comprising a digitizer for digitizing the amplified differential signal and outputting a digital signal representing the pre-pit,
- wherein the pre-pit detection decision circuit determines whether or not the digital signal corresponds to the pre-pit that has been actually formed on the optical disk.

4. The optical disk drive of claim 3, wherein the amplification factor of the amplifier is defined while being changed with a slice level of the digitizer fixed.

5. The optical disk drive of claim 2, wherein the amplification factor of the amplifier is defined in accordance with the differential signal representing the difference between the first and second detection signals that have been generated based on the light beam reflected from a part of the track on which no data has been written yet.

6. The optical disk drive of claim 2, wherein the light-emitting element records information representing the defined amplification factor on the optical disk.

7. The optical disk drive of claim 2, further comprising a storage device for storing information representing the defined amplification factor thereon.

8. The optical disk drive of claim 2, wherein the track of the optical disk has a wobble pattern, and
- wherein the optical disk drive further comprises a wobble digitizer for generating a digital signal representing the wobble pattern, and
- wherein responsive to a pre-pit predicted signal that has been generated in accordance with the output of the wobble digitizer, the pre-pit detection decision circuit determines whether or not the signal component of the differential signal representing the pre-pit corresponds to the pre-pit that has been actually formed on the optical disk.

9. The optical disk drive of claim 1, further comprising a balance controller for adjusting a balance between the first and second detection signals,
- wherein the subtractor generates the differential signal representing the difference between the first and second detection signals that have had their balance adjusted.

10. The optical disk drive of claim 9, further comprising a pre-pit detection decision circuit for determining whether or not a signal component of the amplified differential signal, representing the pre-pit, corresponds to the pre-pit that has been actually formed on the optical disk.

11. The optical disk drive of claim 10, further comprising a pre-pit detection percentage calculator for calculating a pre-pit detection percentage based on a result obtained by the pre-pit detection decision circuit,
- wherein the balance controller defines the balance by the pre-pit detection percentage.

12. The optical disk drive of claim 11, further comprising a digitizer for digitizing the amplified differential signal and outputting a digital signal representing the pre-pit,
- wherein the pre-pit detection decision circuit determines whether or not the digital signal corresponds to the pre-pit that has been actually formed on the optical disk.

13. The optical disk drive of claim 12, further comprising a slice level changer for changing a slice level at the digitizer,
- wherein the slice level changer defines the slice level in accordance with the pre-pit detection percentage.

14. The optical disk drive of claim 13, wherein when predetermined initial values of the balance and the slice level are represented by B0 and S0, respectively,
- the balance to be defined is estimated by comparing an initial pre-pit detection percentage D (B0) corresponding to the initial balance value B0 with another pre-pit detection percentage D (B1) corresponding to another balance value B1, which is greater or smaller than the initial balance value B0 by a predetermined difference ΔB, and
- the slice level to be defined is estimated by comparing another initial pre-pit detection percentage D (S0) corresponding to the initial slice level S0 with another pre-pit detection percentage D (S1) corresponding to another slice level S1, which is greater or smaller than the initial slice level S0 by a predetermined difference ΔS.

15. The optical disk drive of claim 13, wherein the balance and the slice level are defined in accordance with the differential signal representing the difference between the first and second detection signals that have been generated based on the light beam reflected from a part of the track on which data has already been written.

16. The optical disk drive of claim 13, wherein the balance and the slice level are defined while data is being written on the track of the optical disk.

17. The optical disk drive of claim 13, wherein the light-emitting element records information representing the defined balance and information representing the defined slice level on the optical disk.

18. The optical disk drive of claim 13, further comprising a storage device for storing the defined balance and the defined slice level thereon.

19. The optical disk drive of claim 10, wherein the track of the optical disk has a wobble pattern, and
- wherein the optical disk drive further comprises a wobble digitizer for generating a digital signal representing the wobble pattern, and
- wherein responsive to a pre-pit predicted signal that has been generated in accordance with the output of the wobble digitizer, the pre-pit detection decision circuit determines whether or not the signal component of the differential signal representing the pre-pit corresponds to the pre-pit that has been actually formed on the optical disk.

* * * * *